United States Patent [19]

Stiller

[11] Patent Number: 4,561,948
[45] Date of Patent: Dec. 31, 1985

[54] ELECTROCHEMICAL NEUTRALIZATION OF ACID ELECTROLYTE

[75] Inventor: Alfred H. Stiller, Morgantown, W. Va.

[73] Assignee: West Virginia University, Morgantown, W. Va.

[21] Appl. No.: 665,569

[22] Filed: Oct. 29, 1984

[51] Int. Cl.⁴ .............................................. C25B 1/02
[52] U.S. Cl. .................................... 204/129; 204/248
[58] Field of Search ................................ 204/248–249, 204/129, 130

[56] References Cited

U.S. PATENT DOCUMENTS 3,984,295 10/1976 Kametani et al. .................... 204/248
3,994,789 11/1976 Langer et al. ........................ 204/248

Primary Examiner—R. L. Andrews
Attorney, Agent, or Firm—Arnold B. Silverman

[57] ABSTRACT

A process for electrochemical neutralization of acid electrolyte, such as acid mine drainage. A vessel is provided with an anode electrically connected to a cathode with the cathode material being of lesser electroactivity than that of the anode. An acid-containing electrolyte is introduced into the vessel. A voltage gradient is established between the anode and cathode by causing the electrolyte to interact chemically with the anode to effect an oxidation reaction. The cell is caused to convert hydrogen ions into elemental hydrogen and the electrolyte is withdrawn at a pH higher than the pH it had when it entered the vessel. In a preferred embodiment iron is employed in the anode to serve as a sacrificial anode with respect to pyrite which is used in the cathode. A plurality of anodes and cathodes may be provided with electrically nonconductive inert material interposed between adjacent anode and cathode elements or between adjacent anode and cathode pairs. The voltage generated by the cell preferably exceeds the over-potential for the formation of hydrogen within the vessel. Hydrogen may be generated at both the cathode and the anode.

18 Claims, 4 Drawing Figures

ELECTROCHEMICAL NEUTRALIZATION OF ACID ELECTROLYTE

BACKGROUND OF THE INVENTION

1. Field of the Invention

The present invention relates to a method of increasing the pH of an acid solution without requiring the use of externally applied electrical energy.

2. Description of the Prior Art

In recent years increased attention has been directed toward the serious problems which result from acid mine drainage. Water which accumulates in both abandoned and currently active strip mines and deep mines tends to be highly acidic, having a pH on the order of about 2 to 3. It also tends to contain a substantial quantity of dissolved salts, such as iron sulfates, for example. Most of the dissolved iron exists in the ferrous state.

Numerous means of dealing with acid mine drainage have been considered. It has been known, for example, to place these materials in confined environments where they will be isolated from environmental weathering in order to minimize acid mine drainage. Such an approach is difficult and not adapted to be effective and economical in the handling of large volumes of materials.

It has also been known to attempt to neutralize the acid solution by using low cost materials such as limestone or lime including such action combined with the concurrent aeration to oxidize the ferrous iron to the ferric state. Air oxidation is relatively slow and is highly dependent upon the pH of the water and the efficiency of the aeration system. Significant oxidation rates do not occur until the solution becomes neutral or basic, i.e., a pH of greater than about 7. As a result, acid mine drainage which has a high ferrous content is typically neutralized in the more expensive lime rather than limestone which is generally considered to be too weak a base to produce a pH above about 5.5.

It has also been suggested to eliminate the formation of acid mine drainage in the overburden by bacterial activity or iron complexation reactions. These procedures interrupt the acid producing chain reaction. This approach is effective on the spoil pile where acid is being produced, not on the acid stream.

It has also been known to suggest electroprecipitation employing a consumable metal anode and an inert cathode with oxidation of the anode being matched by reduction of the dissolved hydrogen ion to hydrogen gas thereby resulting in a pH increase in solution. Heavy metal removal is accomplished in this system by either precipitation of hydrous oxides or by absorption. This system requires an externally applied source of energy.

In the work performed by Tyco Laboratories, Inc. of Waltham, Massachusetts for the Environmental Protection Agency, bearing a publication date of February, 1972, and entitled "Electrochemical Treatment of Acid Mine Waters," various approaches to treatment of mine acid were considered. The use of a rotating disk electrode and electrodes composed of various materials such as carbon, platinum, and stainless steel were discussed. Also disclosed are anodic oxidation of $Fe^{2+}$ to $Fe^{3+}$ as well as the generation of hydrogen from hydrogen ions taking place at an inert cathode. Use of fluidized bed, packed bed and annular flow reactors are also disclosed. These systems require external energy input.

In spite of the foregoing disclosures, there remains a very real and substantial need for an improved means for neutralizing acid with particular emphasis on acid mine waste.

SUMMARY OF THE INVENTION

The present invention has solved the above-described problems by providing a process which not only effectively neutralizes mine acid water, but also employs materials which are readily available and requires no external power supply.

In a preferred practice of the process of the present invention, the pH of an acid solution is raised. A vessel having an anode electrically connected to a cathode with the cathode being of lesser electroactivity than the anode is provided. A sulfuric acid solution-containing electrolyte is introduced into the vessel and a voltage gradient is established between the anode and the cathode. This causes the electrolyte to interact chemically with the anode and effect an oxidation reaction. The process converts hydrogen ions into elemental hydrogen and the electrolyte is withdrawn at a pH higher than that which it had when it entered.

In a preferred embodiment, the cathode is composed of pyrite and the anode of iron. The iron serves as a sacrificial anode with respect to the pyrite. The sulfuric acid may contain soluble salts. The process may be a batch or continuous flow process.

In other embodiments a plurality of paired anodes and cathodes are provided with interposed inert materials such as sand being provided between adjacent anodes and cathodes or between pairs of adjacent anodes and cathodes.

The hydrogen which evolves is preferably collected.

It is an object of the present invention to provide a process for the efficient neutralization of acid solution, such as acid mine drainage or other acid streams from industrial or other sources.

It is another object of the present invention to provide such a process which does not require external electrical input.

It is a further object of the present invention to provide such a process which will operate efficiently to effect a significant increase in pH.

It is a further object of the present invention to provide such a process which permits advantageous use of materials which are available in a mine environment.

These and other objects of the invention will be more fully understood from the following description of the invention on reference to the illustrations appended hereto.

DESCRIPTION OF THE PREFERRED EMBODIMENTS

Figure 1:
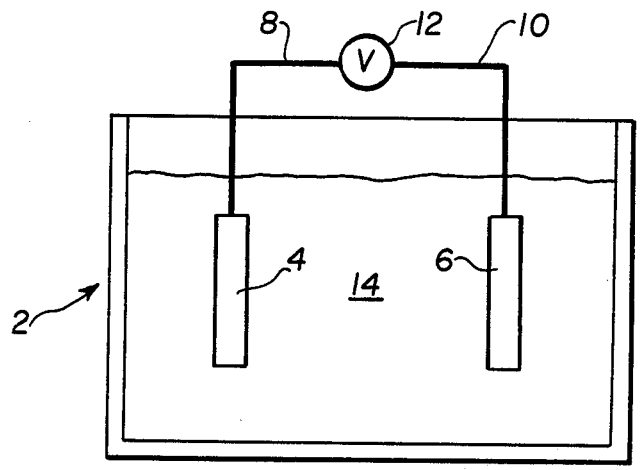
FIG. 1 is a schematic illustration of apparatus which may be used in a form of batch process of the present invention.

In general, mining operations produce three negative by-products. (1) Acid mine drainage results from the oxidizing of deep buried sulfide minerals. (2) Pyrite (FeS$_2$) is an iron-bearing mineral responsible for acid mine drainage and sulfur dioxide pollution during coal combustion. Coal is floated out of the mineral water during a coal cleaning operation and has to be disposed of in order that no acid will be formed. (3) Finally, scrap metal, such as scrap iron, is a by-product of any metal-using operation. The present invention in its preferred form permits use of these three by-product elements to thereby minimize cost and minimize the burden of disposing of them.

It is known that iron dissolves in acid to produce elemental hydrogen and ferrous iron and that the electrolysis of hydrogen ion and subsequent production of hydrogen gas will tend to increase the pH of a solution. As a result, acid mine drainage waste treated in this manner will tend to become neutralized and nonacid-producing. The problem is such action occurs at a very slow rate and is not useful per se. As has been stated hereinbefore, the application of an external voltage to the iron can accelerate the process. The need to apply such an external voltage, however, makes the process uneconomical.

The present invention takes advantage of the fact that pyrite is less electroactive than iron. When two metals of different electroactivity are electrically connected and immersed in an acid solution, an internal voltage is produced. A circuit is completed when an external current flow due to ions in solution occurs. In this case $SO_4^{-2}$ goes to the iron and H goes to the pyrite. If the voltage produced exceeds the overpotential for the formation of hydrogen, hydrogen gas will evolve at the cathode and the anode will sacrificially dissolve in the solution.

Referring to FIG. 1 once again, a preferred embodiment of the present invention which is illustrated in this figure in batch form, but may be employed in continuous form as well, has a vessel 2 in which is positioned an anode 4 composed of a material which is more electroactive than the cathode 6. Electrical conductors 8, 10 connect the anode 4 with the cathode 6 and an interposed voltmeter 12 is provided. An acid electrolyte such as a sulfuric acid-containing electrolyte which may be acid mine drainage 14 is provided. The anode 4 is preferably composed of iron and the cathode 6 is preferably composed of pyrite. A copper wire 8, 10 may serve as the conductor to connect the two. The overvoltage for hydrogen evolution is about 0.67 volts. This voltage may be achieved by the use of a single cell of the type illustrated or several cells electrically connected in series. The ionic concentration gradients in the solution serve to determine the current level, however, the required amperage for hydrogen evolution on large surface areas at low voltage is relatively small.

In the system shown in FIG. 1, oxidation will result in the iron being converted to ferrous ions. A suitable material, such as CaCO$_3$, is added to precipitate Fe. While the pyrite cathode is generally inert, hydrogen ions will be converted to elemental hydrogen on the surface thereof. Subsequently, when FeCO$_3$ is oxidized the CO$_3^{-2}$ anion sequesters the hydrogen ion produced in order the the pH does not change. These reactions are shown in equations (1) through (5)

(1) Fe→Fe$^{+2}$
(2) 2H$^+$→H$_2$ ↑
(3) CaCO$_3$+Fe$^{+2}$→FeCO$_3$+Ca$^{+2}$
(4) 2FeCO$_3$+½ O$_2$+2H$_2$O→Fe$_2$O$_3$+4H+2CO$_3^{-2}$
(5) 2H$_2$CO$_3$→pH=6

Figure 2:
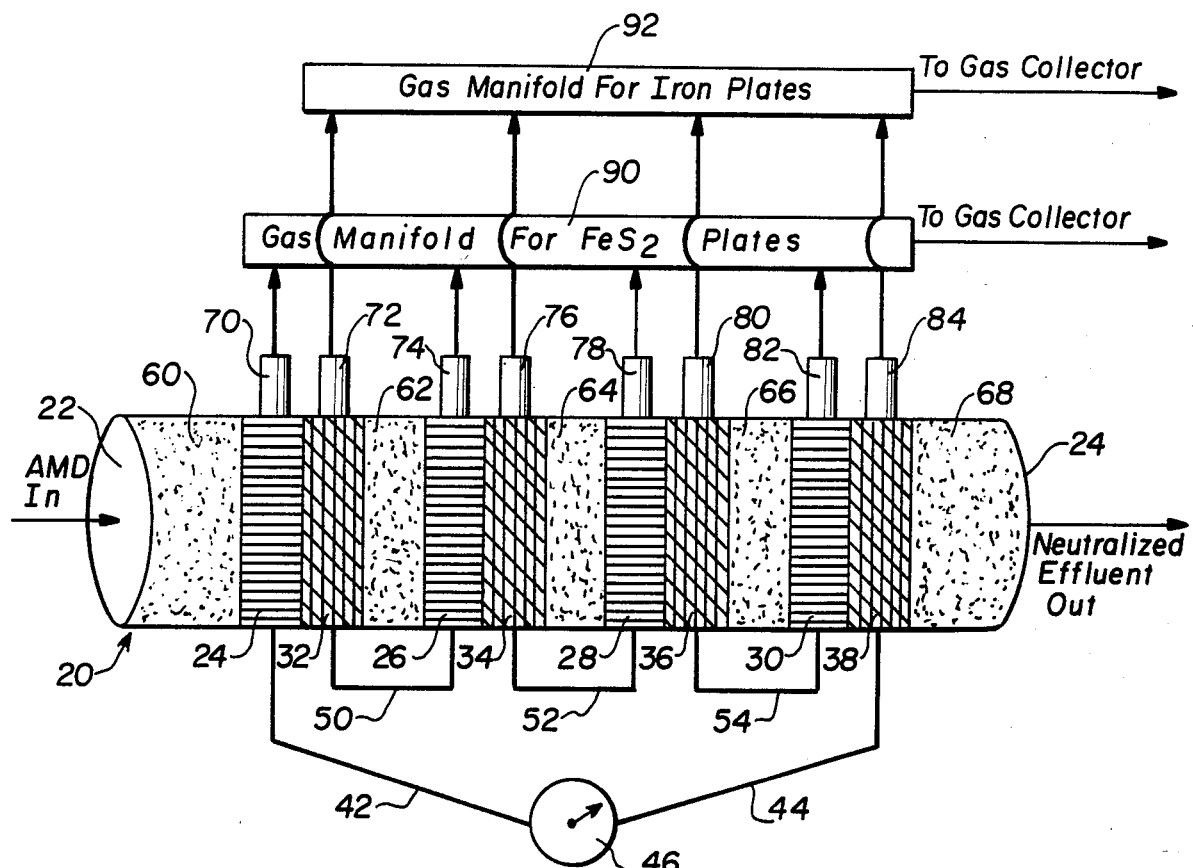
FIG. 2 is a modified version of the present invention showing a continuous flow process employing multiple cathodes and anodes.

Referring to the embodiment shown in FIG. 2, a continuous process will be considered. An elongated tubular housing 20 has entry end 22 into which an acid solution (AMD) will be introduced. A plurality of cathode members, 24, 26, 28, 30 are disposed in close adjacency with respect to a plurality of anode members 32, 34, 36, 38, respectively. Electrical conductors 42, 44 which may be a copper wire, connect cathode 24 with anode 38. A voltmeter 46 is interposed. Electrical conductor 50 connects anode 32 with cathode 26. Electrical conductor 52 connects anode 34 with cathode 28 and electrical conductor 54 electrically connects anode 36 with cathode 30. In this embodiment of the invention it will be noted that an inert porous filler material which may be pulverulent in nature, such as sand, for example, is interposed between adjacent pairs of anodes and cathodes. For example, sand portion 60 is disposed at the entry end, sand section 62 is interposed between anode 32 and cathode 26, sand portion 64 is interposed between anode 34 and cathode 28, sand portion 66 is interposed between anode 36 and cathode 30 and sand portion 68 is disposed adjacent exit end 24 from which neutralized acid emerges. The sand serves to ensure continuous distribution of fluid passing through the cell, i.e., eliminate channeling. The sand also separates the anodes and cathodes and facilitates effective electrical connection therebetween.

It will be noted in FIG. 2 that a plurality of discharge outlets 70, 72, 74, 76, 78, 80, 82, 84 are provided so as to remove hydrogen generated at the anodes and cathodes from the cell. Manifold 90 receives hydrogen generated at the cathodes and manifold 92 receives hydrogen generated at the anodes. This hydrogen may be collected for storage and subsequent sale and use or may be discharged to the atmosphere.

EXAMPLE I

In order to determine the effectiveness of the dry cell illustrated in FIG. 2, tests were performed to monitor the voltage and pH values for the tubular dry cell. The results of these dry tests are shown in Table 1. The tests were performed in a vessel having a volume of about 120 cc, a diameter of 2 inches and length of 15 inches.

TABLE 1

| Voltage and pH values recorded for tubular cell with connection in a series of dry cell configuration | | |
|---|---|---|
| Time (mins) | pH | Voltage |
| 0 | 1.90 | 0.74 |
| 1 | 3.32 | 0.444 |
| 2 | 3.43 | 0.421 |
| 3 | 4.42 | 0.386 |
| 4 | 3.96 | 0.386 |
| 5 | 4.05 | 0.369 |
| 10 | 3.45 | 0.330 |
| 15 | 3.64 | 0.325 |
| 30 | 3.37 | 0.285 |

It is noted that the initial pH measured when the tubular cell was filled was 1.9 and the output voltage was 0.74. Within two minutes the pH increased to 3.43 with a corresponding voltage decrease to 0.421. The total volume of acid mine drainage put through the system was 6.5 liters. The total volume of elemental hydrogen collected was 771.14 cc.

Figure 3:
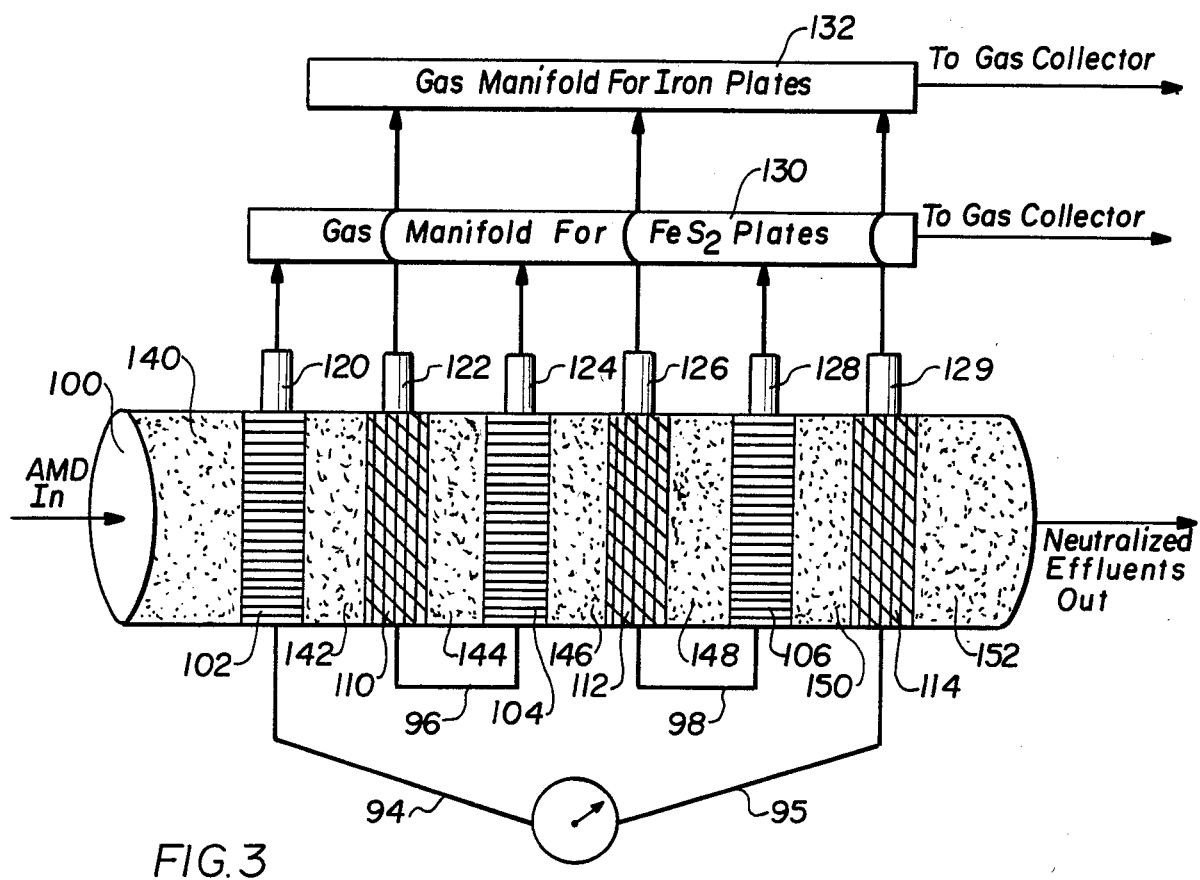
FIG. 3 is a schematic illustration of the embodiment similar to FIG. 2, but with different placement of the inert separator means.

Referring to the embodiment of FIG. 3, a system substantially identical to that of FIG. 2 is shown with the electrical connections being made by conductors 94, 95, 96, 98. Acid mine drainage (AMD) was introduced through entry 100 with pyrite cathodes 102, 104, 106 cooperating with iron anodes 110, 112, 114. Gas outlets 120, 122, 124, 126, 128, 130 are connected either to manifold 129 or manifold 132 to collect the elemental hydrogen formed therein. In this embodiment of the invention, it is noted that the sand sectors are interposed between each anode or cathode element and the adjacent anode or cathode element. An entry sector 140 is provided, a section 142 separates cathode 102 from anode 110 which in turn is separated from cathode 104 by sector 144. Similar separation is provided by sand sectors 146, 148, 150 and exit sector 152 is also provided.

EXAMPLE II

The cell of FIG. 3 was tested and the pH and voltage was recorded with each plate separated from the next plate by sand is presented in Table 2.

TABLE 2

Voltage and pH values for tubular cell, each plate insulated with sand, connected in series

| Time (mins) | pH | Voltage |
| --- | --- | --- |
| 0 | 1.90 | 0.289 |
| 1 | 4.12 | 0.204 |
| 2 | 4.13 | 0.202 |
| 3 | 4.33 | 0.222 |
| 4 | 4.53 | 0.242 |
| 5 | 4.56 | 0.253 |
| 10 | 4.60 | 0.304 |
| 15 | 4.71 | 0.317 |
| 30 | 4.64 | 0.400 |
| 45 | 4.55 | 0.420 |
| 60 | 4.56 | 0.517 |
| 90 | 4.51 | 0.521 |
| 120 | 4.47 | 0.554 |

It is noted that the initial pH was 1.90 and the voltage 0.289, while after one minute the pH had elevated to 4.12 with a corresponding reduction in voltage of 0.204. After four minutes the pH exceeded 4.53 and the voltage was 0.242. The volume put through the system was 11.5 liters and the amount of elemental hydrogen collected was 1044.48 cc.

Figure 4:
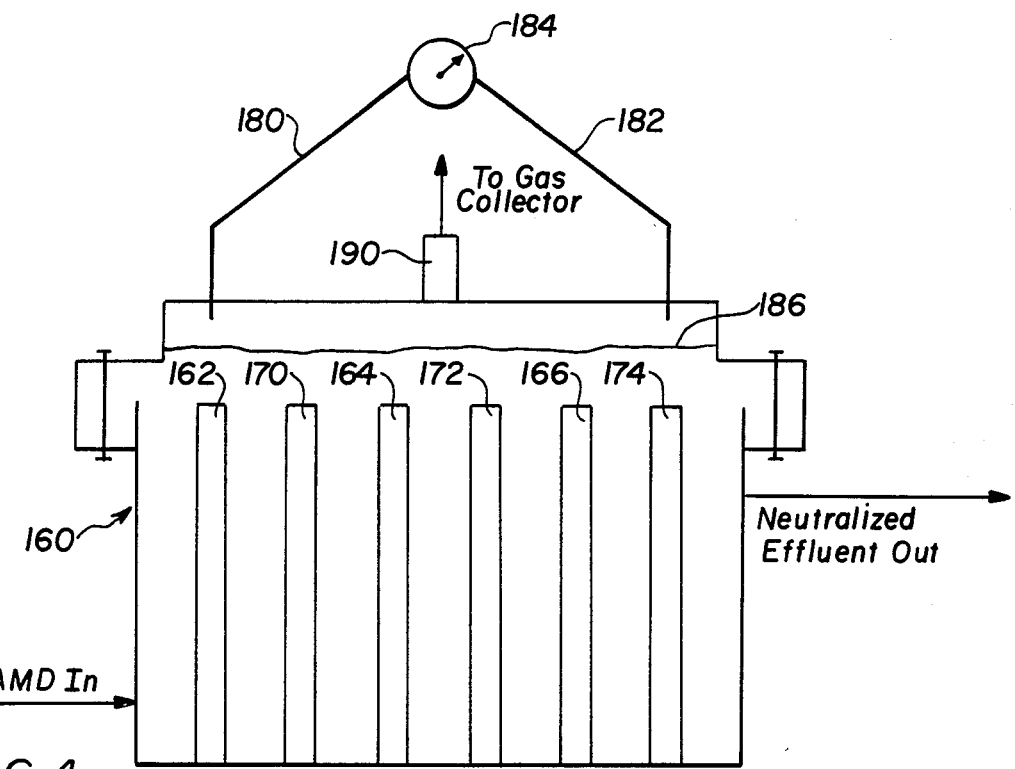
FIG. 4 is a further embodiment of the present invention showing schematically a "wet cell" arrangement.

Referring to FIG. 4, there is shown a wet cell design which was created in an effort to minimize the pressure drop within the cell created by the use of sand or similar inert materials. In the embodiment of FIG. 4, an external cell box 160 was created and internal porous screen cathodes 162, 164, 166 and anodes 170, 172, 174 were provided. Conductors 180, 182 connect opposite sides of the cell and a voltmeter 184 is interposed. The liquid level had an upper surface at 186. Hydrogen gas which was generated is removed through port 190 to a gas collector (not shown). In the preferred form, 60 to 100 mesh ground pyrite was employed in the cathode containers and 30 to 40 mesh iron was provided in the anode containers.

It will be appreciated, therefore, that the present invention has provided an energy efficient and effective means for neutralizing acid solutions such as acid mine drainage. This is accomplished in the preferred form by employing an inert anode which is more electrically active than the cathode. Introduction of the acid results in conversion of the iron to ferrous ion and reduction of hydrogen ions to elemental hydrogen which may be collected. The experimental results confirm the fact that in most cases an increase in the pH by about 2 units may be achieved while remaining under the highest desired pH which may be about 5.8. The cell operates in a stoichemetric manner with every two hydrogen ions produced resulting in consumption of one ferrous ion. Hydrogen is produced at both the anode and cathode. It will be appreciated that the iron in the anode can be dissolved either by sacrificial anode action or direct metallic replacement. The voltage produced in the cell is preferably on the order of about 0.25 to 0.5 volts and is dependent upon the surface area of the material in the anode and cathode, the ionic strength of the fluid and the period of retention of the acidic electrolyte. In order to cause hydrogen to evolve from pyrite, the overvoltage of hydrogen must be exceeded and it will, therefore, generally be necessary to electrically connect two or more cells in series.

As the iron replaces the hydrogen ion in the form of a ferrous solution, it may be desirable to effect an iron removal step from the neutralized water as by precipitation of iron with carbonate and subsequent oxidation to ferric ion using the carbonate anion for pH control.

While for convenience of description herein emphasis had been placed on acid mine drainage and neutralization thereof, it will be appreciated that the invention may be applied equally in other situations where it is desired to neutralize an acid electrolyte.

For convenience of reference herein specific disclosure has been made to the use of a sacrificial anode containing iron and a cathode of lesser electroactivity containing pyrite, it will be appreciated that other materials may be used. Any two materials which differ in oxidation potential will produce a voltage in an ionic solution. By arranging these cells in series, the overpotential of $2H^+ \rightarrow H_2$ can be overcome and the acid neutralized.

Whereas particular embodiments of the invention have been described above for purposes of illustration, it will be appreciated by those skilled in the art that numerous variations of the details may be made without departing from the invention as described in the appended claims.

I claim:
1. A process for raising the pH of an acid solution comprising
providing a vessel with an electrically connected anode and cathode with the cathode being of lesser electroactivity than said anode,
introducing an acid-containing electrolyte into said vessel,
establishing a voltage gradient between said anode and said cathode by causing said electrolyte to interact chemically with said anode to effect an oxidation reaction,
producing said voltage at a level which exceeds the overpotential for the formation of hydrogen, causing said cell to convert hydrogen ions to elemental hydrogen at said cathode, and withdrawing said electrolyte at a pH higher than the pH of the electrolyte when introduced into said vessel.
2. A process for raising the pH of an acid solution comprising
providing a vessel with an electrically connected anode and cathode with the cathode being of lesser electroactivity than said anode,
providing said cathode of pyrite,
introducing an acid-containing electrolyte into said vessel, establishing a voltage gradient between said anode and said cathode by causing said electrolyte to interact chemically with said anode to effect an oxidation reaction, causing said cell to convert hydrogen ions to elemental hydrogen, and withdrawing said electrolyte at a pH higher than the pH of the electrolyte when introduced into said vessel.

3. The process of claim 2 including providing said anode of iron.

4. The process of claim 3 including providing said acid-containing electrolyte as a mixture of sulfuric acid and soluble salts.

5. The process of claim 4 including employing said process to neutralize acid mine drainage.

6. The process of claim 5 including employing said process in a continuous flow system.

7. The process of claim 6 including providing a plurality of said anodes and said cathodes.

8. The process of claim 7 including providing said anodes and cathodes in such position that said electrolyte will flow sequentially into contact with them.

9. The process of claim 7 including effecting conversion of hydrogen ions into hydrogen at said cathodes.

10. The process of claim 9 including effecting conversion of hydrogen ions to hydrogen at said anode.

11. The process of claim 10 including establishing a voltage higher than the overpotential for the formation of hydrogen in said vessel.

12. The process of claim 11 including sequentially dissolving said anode during said process.

13. The process of claim 12 including employing a plurality of said vessels electrically connected in series.

14. The process of claim 13 including collecting said hydrogen gas from said cell.

15. The process of claim 14 including establishing said voltage gradient at about 0.25 to 0.5 volts.

16. The process of claim 15 including passing said electrolyte through a porous inert medium disposed intermediate said anode and said cathode.

17. The process of claim 16 including passing said electrolyte through a porous inert medium disposed between said adjacent pair of said anodes and said cathodes.

18. The process of claim 5 including employing said process as a batch process.

* * * * *